United States Patent
Masuda

(10) Patent No.: US 7,649,150 B2
(45) Date of Patent: Jan. 19, 2010

(54) SENSOR HAVING SWITCH FUNCTION, MANUFACTURING METHOD THEREOF AND ELECTRONIC DEVICE HAVING SENSOR BUILT THEREIN

(75) Inventor: Takashi Masuda, Maebashi (JP)

(73) Assignees: Nittei Musen Co., Ltd. (JP); Gunma Prefecture (JP)

( * ) Notice: Subject to any disclaimer, the term of this patent is extended or adjusted under 35 U.S.C. 154(b) by 458 days.

(21) Appl. No.: 10/592,202

(22) PCT Filed: Mar. 11, 2005

(86) PCT No.: PCT/JP2005/004331

§ 371 (c)(1),
(2), (4) Date: Dec. 8, 2006

(87) PCT Pub. No.: WO2005/088664

PCT Pub. Date: Sep. 22, 2005

(65) Prior Publication Data

US 2008/0037075 A1 Feb. 14, 2008

(30) Foreign Application Priority Data

Mar. 12, 2004 (JP) .............................. 2004-071490

(51) Int. Cl.
*H01H 35/14* (2006.01)
(52) U.S. Cl. .............................. 200/61.45 R; 200/61.51; 200/61.52; 200/61.53
(58) Field of Classification Search .......... 200/61.45 R, 200/61.48, 61.51, 61.52, 61.53; 73/488, 73/514.01, 514.16, 514.35, 514.32, 514.36, 73/514.37, 514.38
See application file for complete search history.

(56) References Cited

U.S. PATENT DOCUMENTS 5,410,113 A * 4/1995 Mielke ................. 200/61.45 R (Continued)

FOREIGN PATENT DOCUMENTS

DE 296 22 968 U1 8/1997

(Continued)

OTHER PUBLICATIONS

International Search Report re application No. PCT/JP2005/004331, dated Jun. 21, 2005.

(Continued)

*Primary Examiner*—Michael A Friedhofer
(74) *Attorney, Agent, or Firm*—Cook Alex Ltd.

(57) ABSTRACT

There are provided a sensor which is small, suitable for reflow soldering by automatic cleaning and automatic mounting, can be manufactured in batch, and has a switch function, and a manufacturing method of the sensor, and a portable telephone having the sensor built therein.

There are provided a sensor having a switch function, the sensor being composed of a first substrate composed of a semiconductor by which a conducting part of the switch is formed, a second substrate composed of the semiconductor by which a conducting part of the switch is formed or an insulator by which the conducting part of the switch is formed, and a moving member having conductivity, wherein any of the first substrate and the second substrate has a cavity-shaped portion and the moving member having conductivity is confined by the first substrate and the second substrate, and a manufacturing method of the sensor, and an electronic device having the sensor built therein.

12 Claims, 8 Drawing Sheets

U.S. PATENT DOCUMENTS

| | | | |
|---|---|---|---|
| 5,987,988 A * | 11/1999 | Kunimi et al. | 73/514.01 |
| 6,797,899 B2 * | 9/2004 | Itoigawa et al. | 200/61.48 |
| 6,867,381 B1 * | 3/2005 | Pan | 200/61.52 |
| 7,180,019 B1 * | 2/2007 | Chiou et al. | 200/61.45 R |
| 7,315,004 B1 * | 1/2008 | Jarzynka et al. | 200/61.45 R |
| 7,411,140 B1 * | 8/2008 | Davison et al. | 200/61.45 R |

FOREIGN PATENT DOCUMENTS

| | | |
|---|---|---|
| DE | 197 33 891 A1 | 2/1998 |
| DE | 101 58 416 C1 | 7/2003 |
| JP | 04-028128 | 1/1992 |
| JP | 06-213703 | 8/1994 |
| JP | 06-282001 | 10/1994 |
| JP | 3034476 U | 2/1997 |
| JP | 09-097545 | 4/1997 |
| JP | 10-048250 | 2/1998 |
| JP | 10-255615 | 9/1998 |
| JP | 11-242052 | 9/1999 |
| JP | 3027166 B2 | 3/2000 |
| JP | 3132225 B2 | 2/2001 |
| JP | 2003-227747 | 8/2003 |
| JP | 2003-279349 | 10/2003 |
| JP | 2003-287421 | 10/2003 |

OTHER PUBLICATIONS

Preliminary Examination Report re application No. PCT/JP2005/004331, dated Apr. 27, 2006.

Supplementary European Search Report re application No. EP 05720602.1, dated Oct. 23, 2008.

* cited by examiner

[Fig. 1]
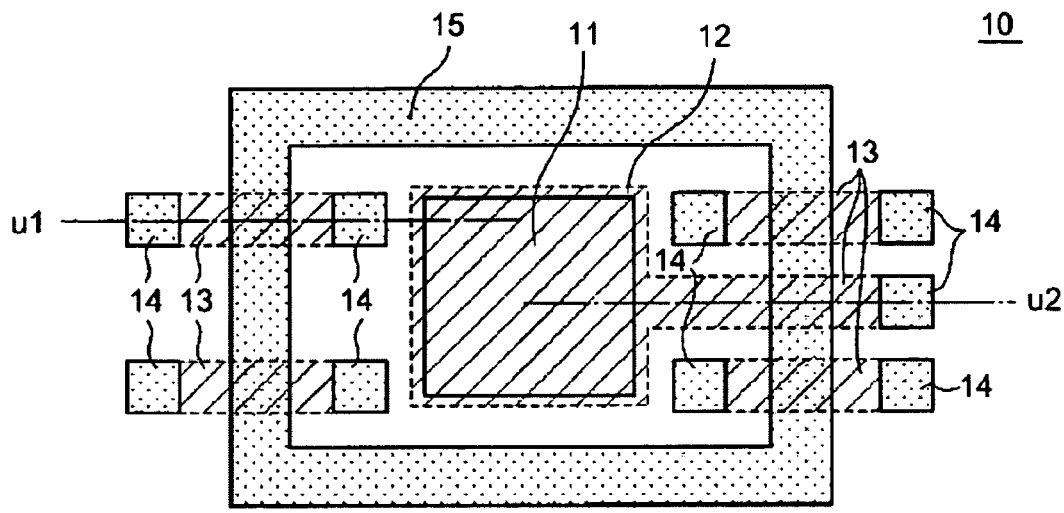
[Fig. 2]
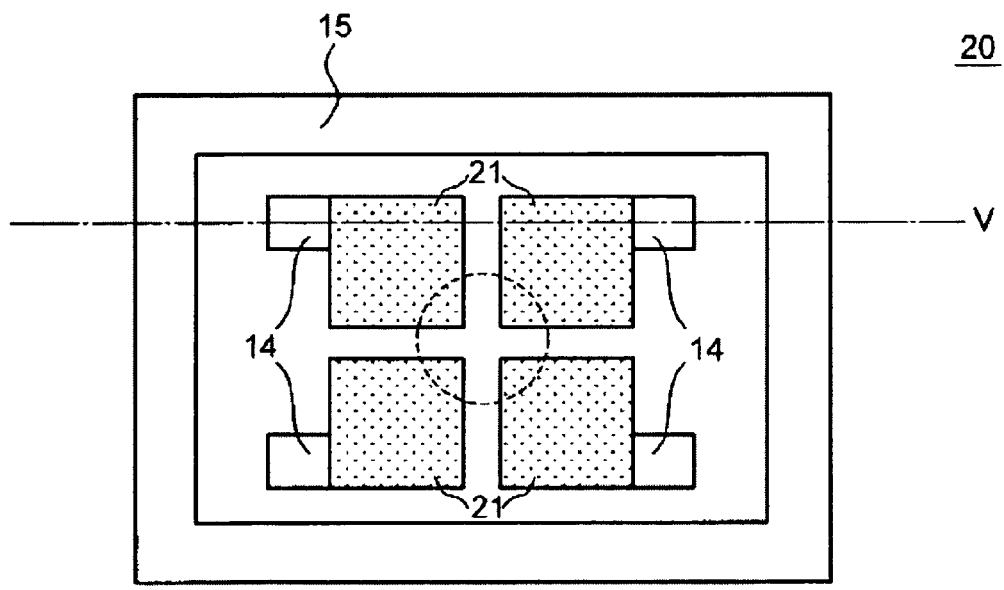

[Fig. 3]
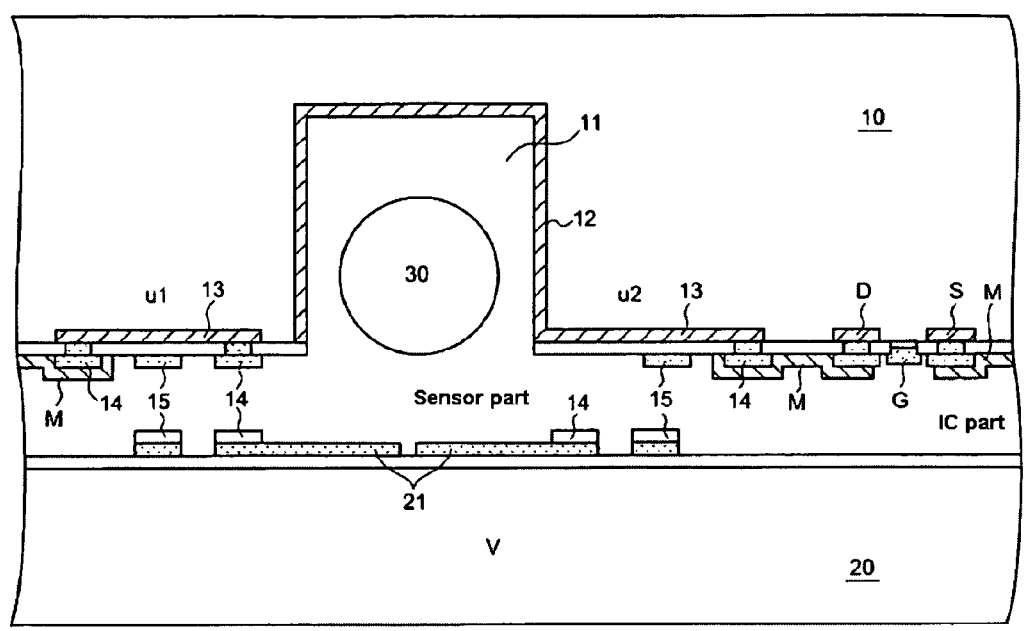

[Fig. 4]
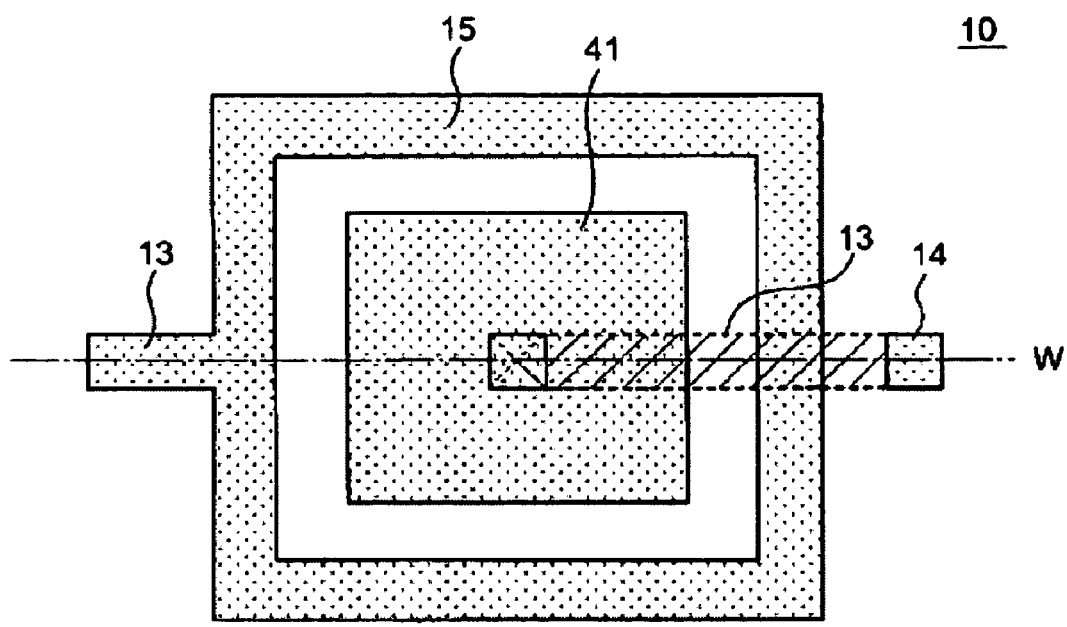
[Fig. 5]
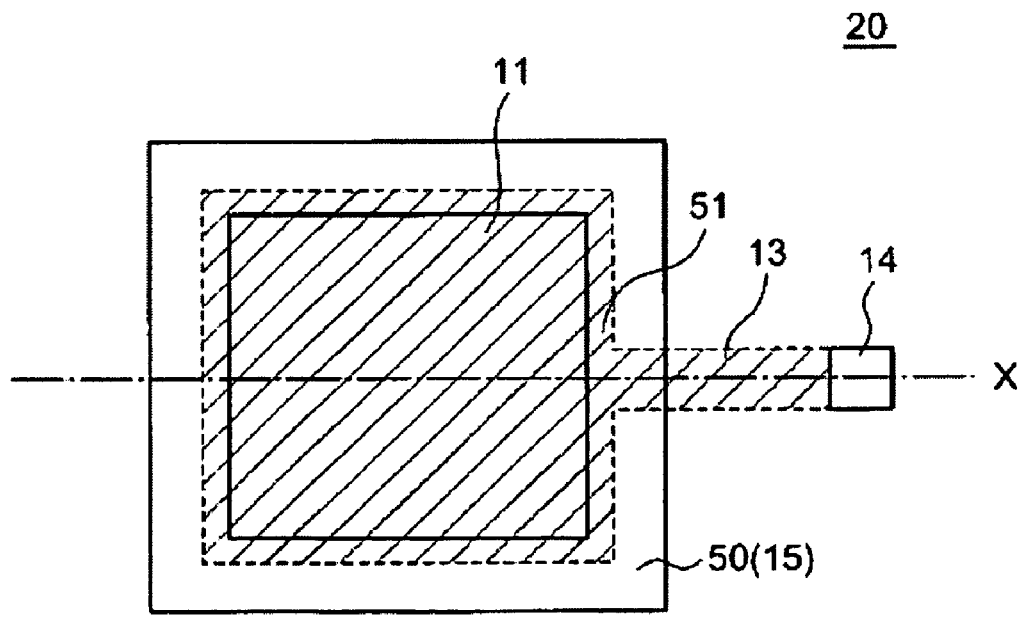

[Fig. 6]
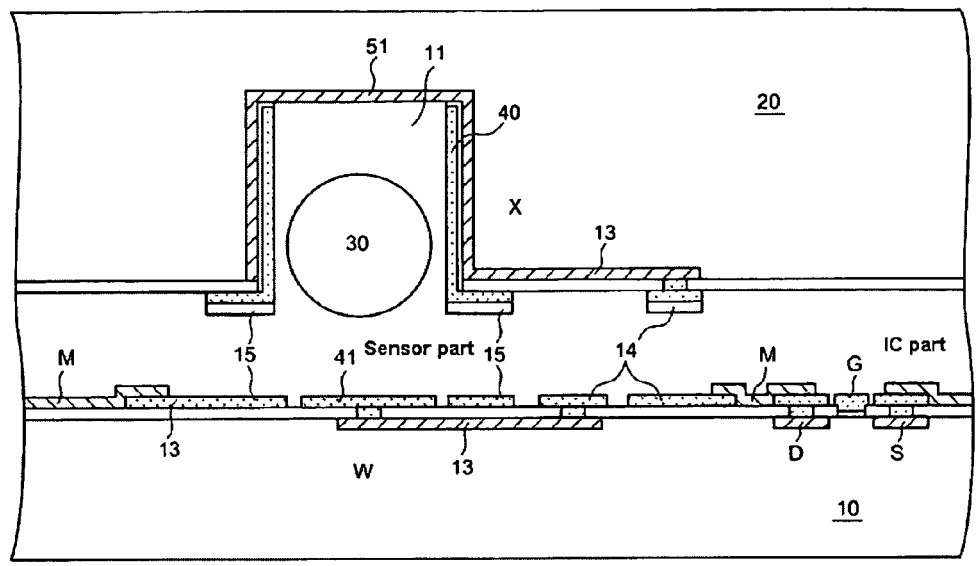
[Fig. 7]
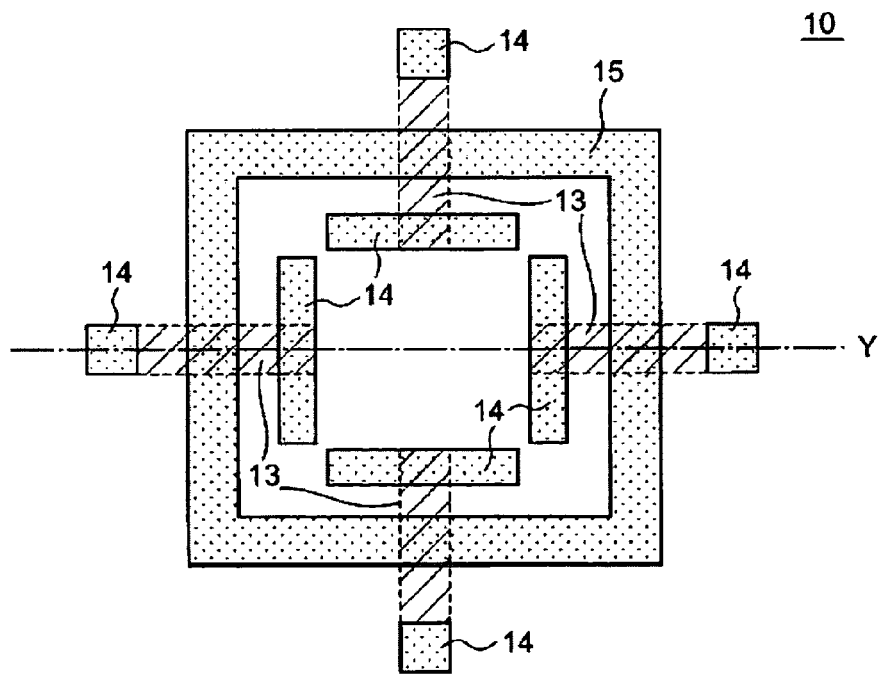

[Fig. 8]
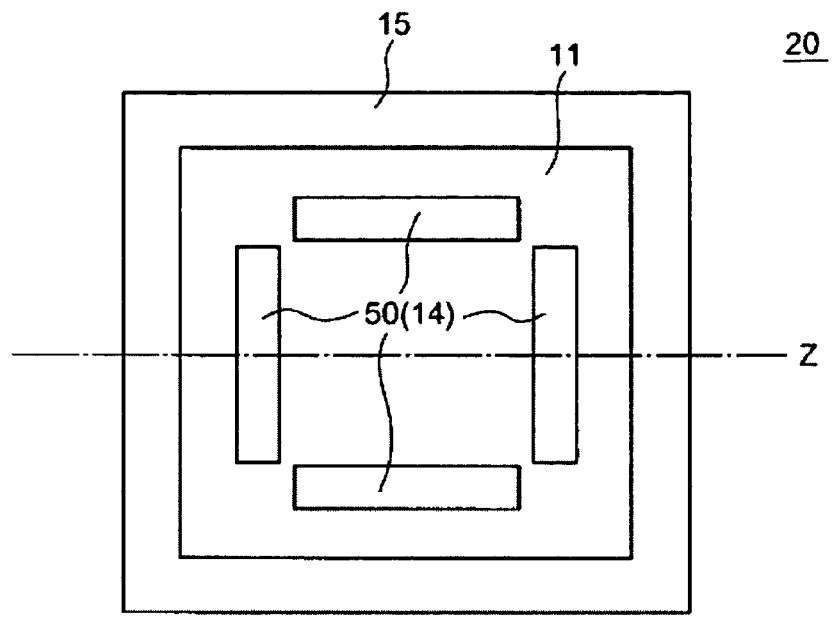
[Fig. 9]
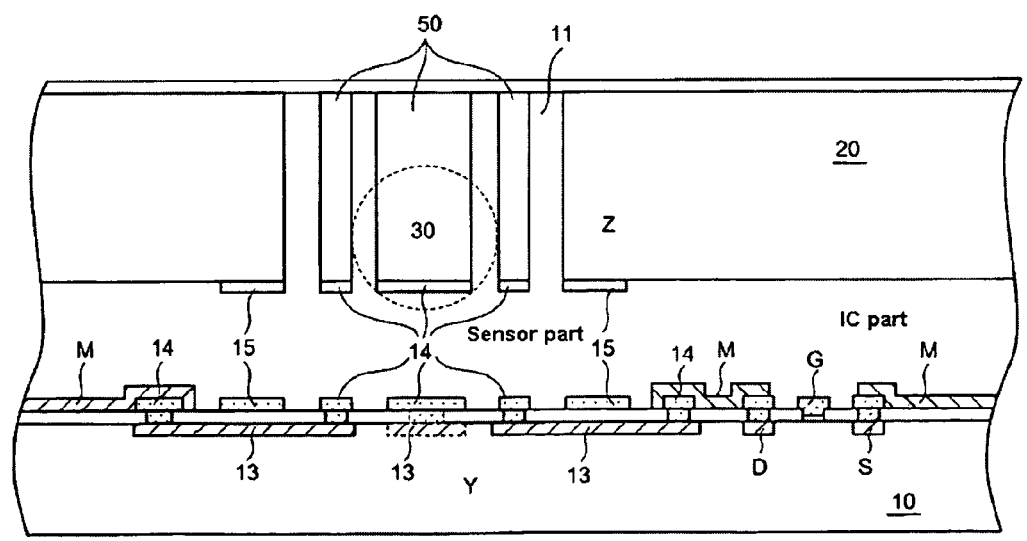

[Fig. 10]
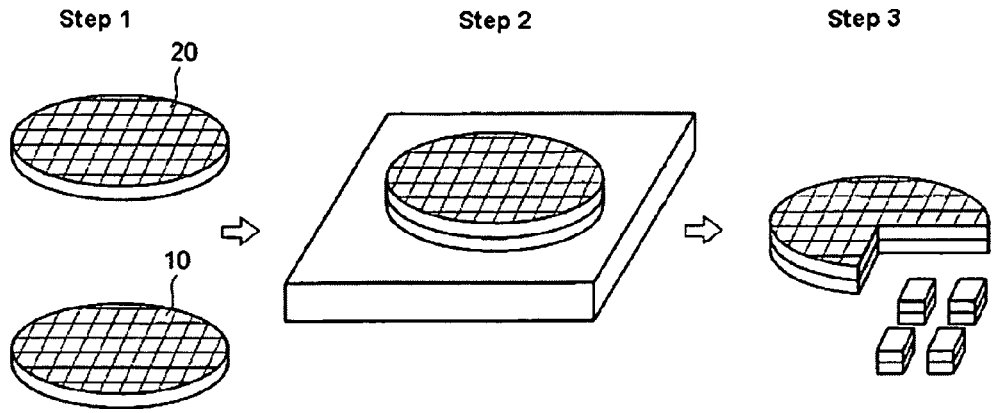
[Fig. 11a]
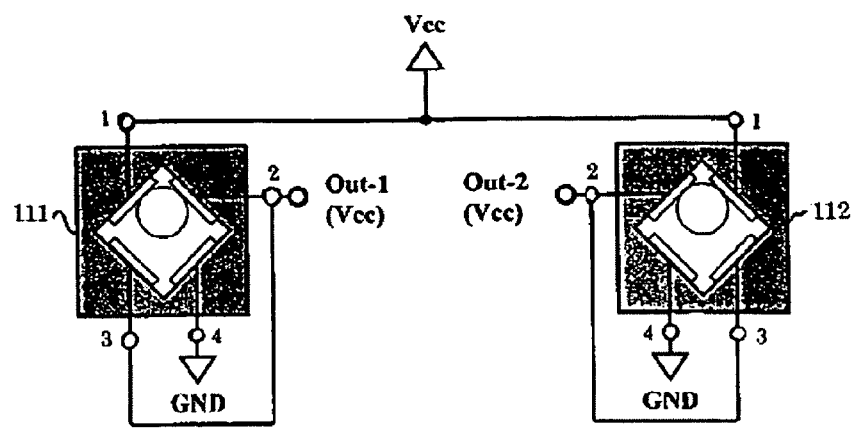
[Fig. 11b]
|  | When ball is positioned upward | When ball is positioned downward | When ball is positioned leftward | When ball is positioned rightward |
|---|---|---|---|---|
| Out-1 | Vcc | GND | Vcc | GND |
| Out-2 | Vcc | GND | GND | Vcc |

[Fig. 11c]
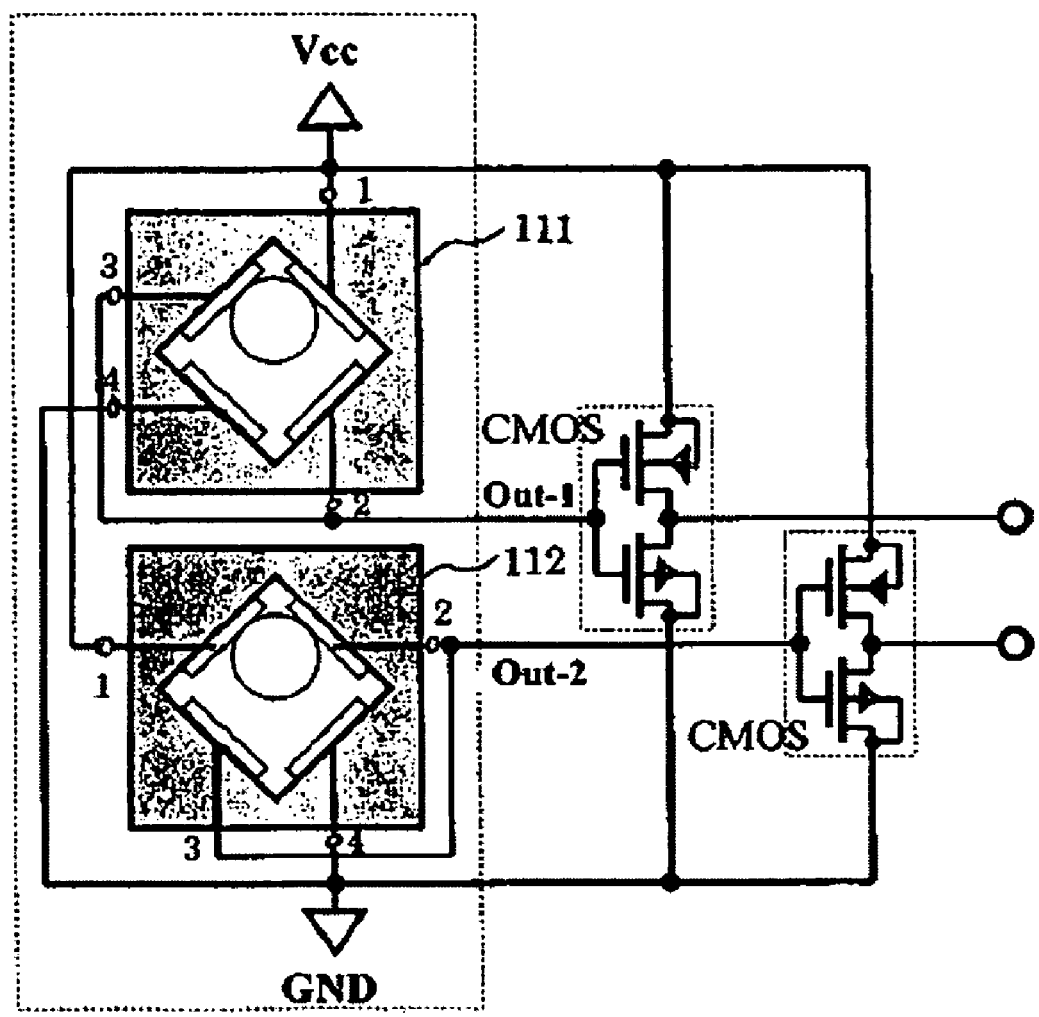

[Fig. 12]
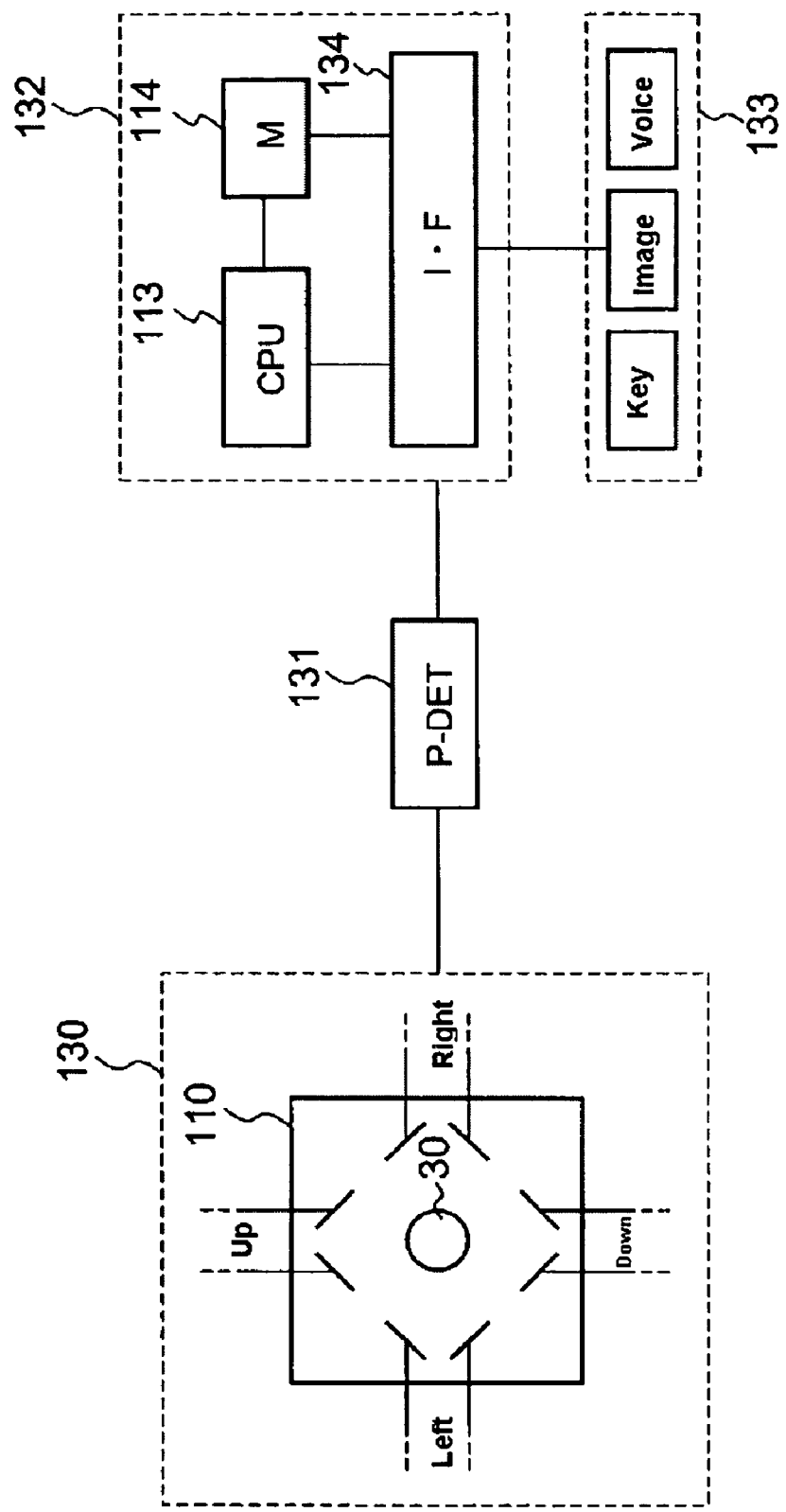

SENSOR HAVING SWITCH FUNCTION, MANUFACTURING METHOD THEREOF AND ELECTRONIC DEVICE HAVING SENSOR BUILT THEREIN

TECHNICAL FIELD

The present invention relates to a sensor having a switch function using a semiconductor integration technology for forming a plurality of elements in batch.

BACKGROUND ART

Conventionally, as a switch or sensor of this type, there is an inclined/vibration switch having a configuration as described in Patent document 1. This type of a switch or sensor had structurally difficulty in being soldered, causing a problem such as switch damage due to heat. For this reason, a vibration sensor, using a heat resistant resin, as described in Patent document 2, is proposed. Even in this case, however, it is difficult to perform dip soldering or reflow soldering, and therefore, a sensor having a construction for enabling to achieve downsizing suitable for reflow soldering by automatic cleaning and automatic mounting, and manufacturing in batch has been required.

Patent document 1: Japanese Patent Application Laid-Open No. Hei09-097545

Patent document 2: Japanese Patent Application Laid-Open No. 2003-227747

DISCLOSURE OF THE INVENTION

Problems to be Solved by the Invention

The present invention is made to solve such problems, and it is an object of the present invention to provide a sensor which is small suitable for reflow soldering by automatic cleaning and automatic mounting, can be manufactured in batch, and has a switch function, a manufacturing method of the sensor, and a portable telephone having the sensor built therein.

Means for Solving the Problems

The sensor having a switch function according to the present invention is characterized in that the sensor has a switch function manufactured by using a semiconductor integrated circuit technology, and comprises: a first substrate made from a semiconductor material on which a conducting part of the switch is formed; a second substrate made from a semiconductor material or an insulating material on which a conducting part of the switch is formed; and a moving member made from a conducting material, wherein either the first or the second substrate has a cavity-shaped portion on a surface of which the conducting part is formed; the conducting part of either the first or the second substrate forms a flat surface electrode; and the moving member is movably held between the first and the second substrate.

The sensor having the switch function is characterized in that the conducting part of the first or the second substrate having the cavity-shaped portion forms: a cavity-shaped electrode along a side surface part and a flat surface part of the cavity-shaped portion; a side surface electrode and a flat surface electrode on the side surface part and the flat surface part respectively; the side surface electrode only; or the flat surface electrode only; and further forms an electrode extraction part; wherein the conducting part of the first or the second substrate not having the cavity-shaped portion holding the moving member forms: the flat surface electrode and an electrode extraction part; or the flat surface electrode only.

The sensor having the switch function is characterized in that wherein each of the cavity-shaped electrode, the side surface electrode, or the flat surface electrode formed by the conducting part of the first and the second substrate forms a single electrode or a plurality of divided electrodes.

The sensor having the switch function is characterized in that wherein the flat surface part of the cavity-shaped portion and/or the flat surface electrode of the first or the second substrate not having the cavity-shaped portion comprise(s) a convex part or a concave part so as to have a stability point at which the moving member stands still.

The sensor having the switch function is characterized in that wherein the flat surface part of the cavity-shaped portion and/or the flat surface part of the first or the second substrate not having the cavity-shaped portion have(has) grooves among the plurality of adjacent electrodes, through which the moving member can move, wherein the grooves are in a horizontal position or in an inclined position.

The sensor having the switch function is characterized in comprising a three dimensional-shaped side surface electrode provided with the same function as that of the side surface electrode.

The sensor having the switch function is characterized in that wherein the first substrate is a complex substrate of the semiconductor and the insulator, having the conducting part.

The sensor having the switch function is characterized in that wherein the sensor having the switch function and a semiconductor integrated circuit are connected and formed on the first substrate.

The sensor having the switch function is characterized in having a normally-on or a normally-off function.

The sensor having the switch function is characterized in that each sensor comprises a plurality of sensors, an arbitrary combination of each sensor or a combination thereof, and has complex functions.

A manufacturing method of the sensor having the switch function is characterized in that the method contains a process of separating all at once each of a sensor having the switch function or a sensor having a switch function integrated with the semiconductor integrated circuit, after a process of holding the conductive moving member by the first and the second substrate.

An electronic device is characterized in incorporating therein the sensor having the switch function built therein.

The electronic device is characterized in being a portable terminal.

ADVANTAGES OF THE INVENTION

According to the sensor having the switch function of the present invention and the manufacturing method of the sensor, a sensor which is small, suitable for reflow soldering by automatic cleaning and automatic mounting, can be manufactured in batch, and has a switch function, a manufacturing method of the sensor, and a portable telephone having the sensor built therein can be provided.

BRIEF DESCRIPTION OF THE DRAWINGS

[FIG. 1] A plain view of a first substrate according to a first embodiment.

[FIG. 2] A plain view of a second substrate according to the first embodiment.

[FIG. 3] A cross-sectional drawing of the first substrate and the second substrate according to the first embodiment.

[FIG. 4] A plain view of a first substrate according to a second embodiment.

[FIG. 5] A plain view of a second substrate according to the second embodiment.

[FIG. 6] A cross-sectional drawing of the first substrate and the second substrate according to the second embodiment.

[FIG. 7] A plain view of a first substrate according to a third embodiment.

[FIG. 8] A plain view of a second substrate according to the third embodiment.

[FIG. 9] A cross-sectional drawing of the first substrate and the second substrate according to the third embodiment.

[FIG. 10] A manufacturing process drawing illustrating batch manufacturing.

[FIG. 11a] A connection diagram of an inclined sensor by a sensor having a switch function according to the present invention.

[FIG. 11b] A state transition diagram illustrating a state of a ball and an output terminal.

[FIG. 11c] A circuit diagram of a complementary inclined switch according to the sensor having the switch function according to the present invention.

[FIG. 12] A block diagram illustrating a display function of a portable telephone according to a fifth embodiment.

REFERENCE NUMERALS

10 First substrate
11 Cavity-shaped portion
12 Cavity-shaped electrode
13 Electrode extraction part
14 Connection pad
15 Hermetic sealing part
20 Second substrate
21, 41, 51 Flat surface substrate
30 Moving member
50 Side surface electrode
110 to 112 Sensor having switch function
130 Sensor part
131 Position detector
132 Input/output control part
133 Application functional part
134 Interface part
U1, U2, V, W, X, Y, Z Section line and cutting surface
S Source
D Drain
G Gate
M Metal wiring part
Vcc Power source
GND Ground
N Discharge and charge terminal
C Capacitor
R Resistance
CPU Processor
M Memory
DET Detector
P-DET Position detector
OUT 1, 2 Output terminal

BEST MODE FOR CARRYING OUT THE INVENTION

Embodiment 1

A first embodiment of a sensor having a switch function according to the present invention will be described with reference to FIG. 1 through FIG. 3. FIG. 1 is a plain view illustrating a structure of a first substrate 10 composed of a semiconductor substrate on which a conducting part of a switch is formed. FIG. 2 is a plain view illustrating a structure of a second substrate composed of a semiconductor in which the conducting part of the switch is formed or an insulator in which the conducting part of the switch is formed, and the second substrate 20 in case of using the semiconductor substrate. FIG. 3 is a cross-sectional drawing of the first substrate 10 being cut along section line U1 and line U2 in FIG. 1 and the second substrate 20 being cut along a section line V in FIG. 2. As illustrated in the cross-sectional drawing in FIG. 3, a sensor part having the switch function is formed on the first substrate together with a semiconductor integrated circuit part (IC part). Also, a moving member 30 having conductivity is illustrated in FIG. 3.

In FIG. 1, the first substrate 10 composed of the semiconductor substrate has a cavity-shaped electrode 12 formed on a cavity-shaped portion 11 and a hermetic sealing part 15. The cavity-shaped electrode 12 is connected to a connection pad 14 through an electrode extraction part 13 and intersects with the hermetic sealing part 15 so as to be connectable to an external circuit. Further, four electrode extraction parts 13 similarly intersect with the hermetic sealing part 15, and both edges thereof are connected to the connection pads so as to be connectable to an external circuit. In addition, the hermetic sealing part 15 is used to seal the moving member 30 having conductivity inside the cavity-shaped portion 11. The cavity-shaped electrode 12, the electrode extraction part 13, and the connection pad 14 form a conducting part of the switch. The conducting part is not required to be a conductor in a sensor for detecting a slight amount of electric current or detecting only voltage, but may be a semiconductor.

The cavity-shaped portion 11 is formed by chemical etching (wet etching, dry etching), physical etching (spattering, milling, machining), or a combination thereof, which are used in a normal semiconductor process. The cavity-shaped electrode 12 is formed by using a diffusion layer according to the same process as the IC part. In addition, the cavity-shaped electrode 12 is connected to the connection pad 14 through the electrode extraction part 13 using the same diffusion layer. The connection pad 14 is formed by using a polysilicon layer according to the same process as the IC part. Other four electrode extraction parts 13 and the connection pads thereof 14 are formed according to the same process. The hermetic sealing parts 15 are also formed by using the polysilicon layer according to the same process as the IC part, and an interlayer between the hermetic sealing part 15 and the electrode extraction parts 13 is insulated by an oxide film formed in a process of forming an oxide film for a MOS transistor gate. Since the oxide film is also formed on a surface of the diffusion layer of the cavity-shaped electrode 12, the oxide film is removed by being simultaneously etched at the time of etching of a contact hole being performed before forming a polysilicon layer.

In FIG. 2, the second substrate 20 using the semiconductor substrate includes four flat surface electrodes 21 which function as the conducting part of the switch, and the hermetic sealing parts 15.

In forming the flat surface electrodes 21, the oxide film is formed in a process of forming a field oxide film being formed for a diffusion mask or a process of forming an oxide film for a MOS transistor gate, which are used in firstly forming a diffusion layer of the first substrate 10. Then, a polysilicon layer is formed in a process of forming the polysilicon layer to be processed to the shape of the four flat surface electrodes 21. Further, on the connection pads 14 of the flat surface electrodes 21, for instance, gold is evaporated so as to be connected to the connection pads 14 inside the hermetic sealing part 15 by thermal compression.

The hermetic sealing part 15 is also formed in a similar process and gold is evaporated thereon.

In FIG. 3, the first substrate 10 and the second substrate 20 can hermetically seal the moving member 30 inside the cavity-shaped electrode 12, by attaching each other's hermetic sealing parts 15 by thermal compression. The moving member 30 according to the present first embodiment is a silicon ball and forms ohmic contact by diffusion of the dopant that is the same sort of the dopant as being diffused in the cavity-shaped electrode 12 and the flat surface electrodes 21. In addition, the cavity-shaped electrode 12 and the flat surface electrodes 21 are extracted to the connection pads 14 by the electrode extraction parts 13 to be connected to the semiconductor integrated circuit of the IC part, thereby functioning as a sensor having a function of a switch of one-circuit and four contact points or one pseudo-circuit, two contact points, and ×4. In addition, in order to maintain a normally-off state, a circular convex portion or a concave portion may be formed in the shape of a circular form as indicated by a dotted line in FIG. 2 by a normal semiconductor process so as to have a stability point for rendering the moving member 30 to stand still. Further, to enable switches of two electrodes mutually adjacent in the four flat surface electrodes 21, it is possible to provide a groove through which the moving member can move between the adjacent electrodes, and the groove may be situated in a horizontal position or in an inclined position.

Embodiment 2

A second embodiment of the sensor having the switch function according to the present invention will be described with reference to FIG. 4 through FIG. 6. FIG. 4 is a plain view illustrating a structure of the first substrate 10 composed of a semiconductor substrate on which a conducting part of the switch is formed. FIG. 5 is a plain view illustrating a structure of a second substrate 20 composed of a semiconductor in which the conducting part of the switch is formed or an insulator in which the conducting part of the switch is formed, and the second substrate 20 in case of using the semiconductor substrate. FIG. 6 is a cross-sectional drawing of the first substrate 10 being cut along a section line W in FIG. 4 and the second substrate 20 being cut along a section line X in FIG. 5. As illustrated in the cross-sectional drawing in FIG. 6, a sensor part having the switch function is formed on the first substrate together with a semiconductor integrated circuit part (IC part). In addition, a moving member 30 is also illustrated in FIG. 6.

In FIG. 4, the first substrate 10 composed of the semiconductor substrate has a flat surface electrode 41 functioning as the conducting part of the switch, and a hermetic sealing parts 15. The flat surface electrode 41 is connected to a connection pad 14 through electrode extraction parts 13 and intersects with the hermetic sealing part 15 so as to be connectable to an external circuit. The hermetic sealing part 15 according to the second embodiment also has, in addition, a function of the electrode extraction parts 13 in a side surface electrode 50 illustrated in FIG. 5.

In forming the flat surface electrode 41, first a field oxide film for a diffusion mask which are used in firstly forming a diffusion layer of the IC part of the first substrate is formed, and the diffusion layer is formed, and thereby the electrode extraction parts 13 is formed. Then, a polysilicon layer is formed in a process of forming the polysilicon layer and is processed into the flat surface electrode 41. Simultaneously, at this time, polysilicon for the hermetic sealing part 15 and the connection pad 14 are also provided a shape processing. The hermetic sealing part 15 and the electrode extraction parts 13 are insulated in the interlayer space by an oxide film formed in a process of forming an oxide film for a MOS transistor gate.

In FIG. 5, the second substrate 20 using the semiconductor substrate includes the side surface electrode 50 and a flat surface electrode 51, which function as the conducting part of the switch being formed in a cavity-shaped portion 11. The flat surface electrode 51 is connected to the connection pad 14 through the electrode extraction part 13 and intersects with the hermetic sealing part 15 so as to be connectable to an external circuit. The side surface electrode 50 also has, in addition, functions of the hermetic sealing part 15. The hermetic sealing part 15 is used for sealing a moving member 30 into the cavity-shaped portion 11.

The cavity-shaped portion 11 is formed by chemical etching (wet etching, dry etching), physical etching (milling, machining), or a combination thereof, which are used in a normal semiconductor process. The flat surface electrode 51 is formed by using a diffusion layer according to the same process as the IC part. In addition, the flat surface electrode 51 is connected to the connection pad 14 through the electrode extraction part 13 using the same diffusion layer. The connection pad 14 is formed by using a polysilicon layer according to the same process as the IC part. The side surface electrode 50 is also formed according to the same polysilicon process. The flat surface electrode 12 and the side surface electrode 50 are insulated in the interlayer spacing by an oxide film being formed in a process of forming an oxide film for a MOS transistor gate. Since the oxide film is also formed on a surface of the diffusion layer of the flat surface electrode 51, the oxide film is removed by being simultaneously etched at the time of etching a contact hole to be performed before forming the polysilicon layer. Further, on the connection pad 14 of the flat surface electrode 51 and the hermetic sealing part 15 of the side surface electrode 50, for instance, gold is evaporated so as to be connected to the connection pads 14 and the hermetic sealing part 15, illustrated in FIG. 4, by thermal compression.

In FIG. 6, the first substrate 10 and the second substrate 20 can hermetically seal the moving member 30 inside the cavity-shaped electrode 12, by attaching each other's hermetic sealing parts 15 by thermal compression. The moving member 30 according to the second embodiment is a silicon ball and has conductivity, with the dopant being diffused that is the same sort of the dopant as being diffused in the flat surface electrodes 41 and 51, and the side surface electrode 50. In addition, the flat surface electrodes 41 and 51, and the side surface electrode 50 are extracted to the connection pads 14 by the extraction part 13 to be connected to the semiconductor integrated circuit of the IC part, thereby functioning as a sensor having a function of a switch of one-circuit and two contact points. In addition, in order to maintain a normally-off state, a convex portion or a concave portion may be formed on a side of the flat surface electrodes 41 and 51 by a normal semiconductor process so as to have a stability point for rendering the moving member 30 to stand still.

Embodiment 3

A third embodiment of the sensor having the switch function according to the present invention will be described with reference to FIG. 7 through FIG. 9. FIG. 7 is a plain view illustrating a structure of a first substrate 10 composed of a semiconductor substrate on which a conducting part of the switch is formed. FIG. 8 is a plain view illustrating a structure of a second substrate 20 composed of a semiconductor in which the conducting part of the switch is formed or an insulator in which the conducting part of the switch is formed, and the second substrate 20 in case of using the semiconductor substrate. FIG. 9 is a cross-sectional drawing of the first substrate 10 being cut along a section line Y in FIG. 7 and the second substrate 20 being cut along a section line Z in FIG. 8. As illustrated in the cross-sectional drawing in FIG. 9, a sensor part having the switch function is formed on the first substrate together with a semiconductor integrated circuit part (IC part). In addition, a moving member 30 having conductivity is also indicated in FIG. 9 by dotted line.

In FIG. 7, the first substrate 10 composed of the semiconductor substrate has a hermetic sealing part 15 and an electrode extraction part 13 which functions as the conducting part of the switch. The electrode extraction part 13 is connected to a connection pad 14 and intersects with the hermetic sealing part 15 so as to be connectable to an external circuit.

In forming the electrode extraction part 13, a field oxide film for a diffusion mask which are used in firstly forming a diffusion layer of the IC part of the first substrate is formed, and the diffusion layer is formed, and thereby the electrode extraction part 13 is formed. Then, a polysilicon layer is formed in a process of forming the polysilicon layer and is provided a shape processing to form the hermetic sealing part 15 and the connection pad 15. The hermetic sealing part 15 and the electrode extraction part 13 are insulated in the interlayer space by an oxide film formed in a process of forming an oxide film for a MOS transistor gate.

In FIG. 8, the second substrate 20 using the semiconductor substrate includes the hermetic sealing part 15 and a side surface electrode 50 which functions as the conducting part of the switch in a cavity-shaped portion 11. The side surface electrode 50 also has, in addition, a function of the connection pad 14 and is connectable to an external circuit. The hermetic sealing part 15 is used for sealing a moving member 30 into the side surface electrode 50.

In forming the cavity-shaped portion 11 and the side surface electrode 50, first a thick oxide film corresponding to a field oxide film for a diffusion mask is formed on the second substrate 20. Using the oxide film as the mask, the film is eroded and chipped off to the thick oxide film on the opposite side by chemical etching (wet etching, dry etching), physical etching (spattering, milling, machining), or a combination thereof, which are used in a normal semiconductor process, and the cavity-shaped portion 11 and the side surface electrode 50 are formed. In general, a film thickness of the thick oxide film on the opposite side is equal to or less than a few micrometers, however, since the shape of the cavity has a thickness of 500 micrometers or so, there is no problem in mechanical strength. On the side surface electrode 50, the connection pad 14 and the hermetic sealing part 15, for instance, gold is evaporated so as to be connected to the connection pad 14 and the hermetic sealing part 15 illustrated in FIG. 7 by thermal compression. Accordingly, the thick oxide film on these parts is removed in the process prior to gold evaporation.

In FIG. 9, the first substrate 10 and the second substrate 20 can hermetically seal the moving member 30 inside the cavity-shaped electrode 12, by attaching each other's hermetic sealing parts 15 by thermal compression. The moving member 30 according to the third embodiment is a silicon ball and has conductivity, by diffusion of the dopant that is the same sort of the dopant as being diffused in the side surface electrode 50. In addition, the side surface electrode 50 is extracted to the connection pad 14 by the extraction part 13 to be connected to the semiconductor integrated circuit of the IC part, thereby functioning as a sensor having a function of a switch of four pseudo-circuits and one contact point. In addition, in order to maintain a normally-off state, a convex portion or a concave portion may be formed on a flat part in the cavity of both of the substrate 10 and 20 by a normal semiconductor process so as to have a stability point for rendering the moving member 30 to stand still.

The shape and numbers of division of each electrode, and further a process in forming each electrode, as described above, are not quite limited to the embodiment, any design and process according to the targeted switch circuit may be selected. When the amount of the current as output is required, it is possible to render the diffusion layer and the polysilicon layer to be metal-rich and to provide the surface of the moving member 30 with gold evaporation. In hermetic sealing, vacuum sealing or any sealing by a specific gas atmosphere may be permissible. In the embodiments 1 through 3, the electrode is formed integrally with the IC part, however, it is possible to individually manufacture the same by the same semiconductor integration technology. In addition, in mounting on a substrate, in case of embodiment 1, by being connected to the substrate through face bonding, the moving member 30 normally contacts the side of the flat surface electrode 21.

FIG. 10 is a manufacturing process drawing illustrating the hermetic sealing process for enabling batch manufacturing. In step 1, the first substrate 10 and the second substrate 20 mounting the moving member 30 thereon are aligned based on an alignment mark at the accuracy of equaling to or less than a few micrometers. In step 2, the first substrate 10 and the second substrate 20 are subjected to thermal compression in a vacuum or gas atmosphere, and thereby provide the moving member 30 with hermetic sealing. As the case may be, after electrical inspection, in step 3, the substrates may be cut and divided into chip form by a dicing saw, and so forth. Thereafter, these chips are automatically cleaned and automatically dried, and then are moved onto a final inspection process, enabling batch manufacturing. The chips to be cut and divided may be a simple body of sensor having the switch function as described in the embodiment or may be a complex body with the semiconductor integrated circuit.

Embodiment 4

FIG. 11a is a connection diagram of an inclined sensor for detecting a lateral inclination and a vertical inclination by using two sensors having a switch function. A first terminal of a sensor 111 having the sensor function is connected to a power source, a second terminal is connected to a third terminal and an output terminal OUT 1, and a fourth terminal is connected to ground GND. In addition, a first terminal of a sensor 112 having the switch function is connected to a power source Vcc and a second terminal is connected to a third terminal and an output terminal OUT 2. When the sensors 111 and 112 are inclined upward, the output of the output terminals OUT 1 and 2 reaches a high level, and becomes 0 when the sensors are inclined downward. In addition, when the sensors 111 and 112 are inclined leftward, the output of the output terminal OUT 1 reaches a high level, and becomes 0 when the sensors are inclined rightward. At that time, the output of the output terminal OUT 2 becomes opposite to the output of the output terminal OUT 1, and thereby the vertical and lateral inclination can be detected.

FIG. 11b is a drawing illustrating the relation between a state of a ball and a voltage level of the output terminals OUT 1 and 2. When the ball is positioned upward, the power source level is outputted and when the ball is positioned downward, the ground level is outputted. When the ball is positioned leftward, the output of the output terminal OUT 1 becomes the power source level and the output of the output terminal OUT 2 becomes the ground level, and when the ball is positioned rightward, output of each level indicates the reverse level respectively. As illustrated in FIG. 11c, by inputting the output of the inclined sensors into a CMOS inverter, it is possible to obtain a complementary output indicated in FIG. 11b with little power consumption required.

Embodiment 5

FIG. 12 is a block diagram illustrating display functions of a portable telephone including a sensor having the switch function according to the present invention and a position detector of the moving member built therein. A sensor part 130 is connected to a position detector 131 of the moving member. The position detector 131 is connected to an input/output control part of the portable telephone. The input/output control part 132 comprises an interface circuit 134, a processor 113 and a memory 114, and is connected to application function parts 133 such as an audio function, an image function, an operation key function, and so forth.

The position detector 131 detects a position of the moving member 30 from an output of the sensor 130, and outputs the detected result to the input/output control part 132. The input/output control part 132 receives the signal by the interface circuit 134, determines to which of the applications the detected position of the moving member corresponds by the processor 113 and the memory 114, and issues a directive to an application functional part 133 to direct the contents of application. In response to the directive, the application functional part 133 renders the applications such as an audio, an image, an operation key, and so forth to move.

For instance, in case of using applications such as a web information, a navigation, a mail check, and so forth, while handling a screen, if tilting upward and slightly shaking the portable telephone, the sensor part 130 thereby catches the vibration and the input/output control part 132 operates the application functional part 113 so that the screen may be scroll to the top side, based on the signal of the position detector 131. By taking hold of the vertical and lateral positions of the moving member 30, it is possible to scroll the page vertically and laterally. In case of inputting characters, if the portable telephone is tilted leftward, a kana-kanji conversion operation is possible, and if the portable telephone is tilted rightward, a katakana conversion is possible. In case of taking a photograph, if a lower position is detected, the screen can be used as is, and if a left position is detected, the screen can be always used in an upright state by turning the display by 90 degrees. When it becomes hard to catch the voice while making a telephone call, it is possible to control the sound so as to become loud when tilting the portable phone leftward and, to the contrary, to become soft when tilting it rightward. In addition, when the portable phone is in a standby state, it is also possible to use the portable phone as a pedometer by detecting a chattering state by means of walking. As to the application, it is not limited to the above-described application examples, and there is no limitation to the application, if the application provides convenience to a user. As described above, in a small-sized portable terminal device such as a portable telephone, it is possible to solve the problem such that there is no space for mounting a switch therein, even if there is hope for operating a button for functional extension.

INDUSTRIAL APPLICABILITY

By using the sensor according to the present invention as a sensor for detecting a direction of gravitational force, it enables to use the sensor for detecting a relation between a setting direction of a driver of DVD, CD-ROM, etc. and a device so as to adjust uneven rotation thereof, for automatically switching a display screen of a digital camera and so forth toward the gravitational direction, and for determining vertical and lateral positions by an endoscope camera, a piping work, an automatic boring machine for hot spring, and so forth, so as to decide the direction. By using the function of the tilting sensor according to the present invention as a level, it enables to use the sensor for adjusting the levelness and inclination of a copier, an air conditioner, a drain ditch and so forth, for detecting a falling of a stove, a fan heater and so forth, for detecting an uphill road for a hybrid car and so forth, for detecting the inclination of an entry to a highway when the highway runs in parallel with a general road so as to reflect the detected result in a navigation operation together with a position confirmed by the GPS, and for carrying forward a game by a switch for a watch, a float switch, or a portable game device at a inclined state and so forth. By using the sensor according to the present invention as a chattering sensor, it enables to use the sensor for theft notification of a pedometer, a car, a motorcycle and so forth according to detection of chattering, for identification of a position of a stolen property and a wandering old person by specifying the chattering position by the GPS, for confirmation of life and death of a single old person by communicating a relative thereof or a doctor when, after having specified the chattering time, the chattering is not detected for more than a predetermined period of time, and for saving of battery of the portable devices and so forth. Further, since the sensor according to the present invention can be applied to utilization of a sensor for detecting a gravitational direction and movement such as inclination, rotation, vibration, falling and so forth, widespread application of the sensor can be expected as a sensor each of which is formed of a plurality of the sensors, an arbitrary combination of each sensor, or a combination thereof.

The invention claimed is:

1. A sensor having a switch function manufactured by using a semiconductor integrated circuit technology, comprising:
   a first substrate made from a semiconductor material on which a conducting part of the switch is formed;
   a second substrate made from a semiconductor material or an insulating material on which a conducting part of the switch is formed; and
   a moving member made from a conducting material; wherein
   either the first or the second substrate has a cavity-shaped portion on a surface of which the conducting part is formed;
   the conducting part of either the first or the second substrate forms a flat surface electrode; and
   the moving member is movably held between the first and the second substrate; wherein
   the conducting part of the first or the second substrate having the cavity-shaped portion forms:
   a cavity-shaped electrode along a side surface part and a flat surface part of the cavity-shaped portion;

a side surface electrode and a flat surface electrode on the side surface part and the flat surface part respectively;

the side surface electrode only; or the flat surface electrode only; wherein each of the cavity-shaped electrode, the side surface electrode or the flat surface electrode contains an electrode extraction part; wherein the electrode extraction part formed on the semiconductor includes a diffusion layer; and the conducting part of the first or the second substrate not having the cavity-shaped portion holding the moving member forms;

the flat surface electrode having an electrode extraction part; or the flat surface electrode only.

2. The sensor having the switch function according to claim 1, wherein each of the cavity-shaped electrode, the side surface electrode, or the flat surface electrode formed by the conducting part of the first and the second substrate forms a single electrode or a plurality of divided electrodes.

3. The sensor having the switch function according to claim 2, wherein the flat surface part of the cavity-shaped portion and/or the flat surface electrode of the first or the second substrate not having the cavity-shaped portion comprise(s) a convex part or a concave part so as to have a stability point at which the moving member stands still.

4. The sensor having the switch function according to claim 2, wherein the flat surface part of the cavity-shaped portion and/or the flat surface electrode of the first or the second substrate not having the cavity-shaped portion have(has) the plurality of electrodes; wherein grooves are provided among the plurality of adjacent electrodes through which the moving member can move, wherein the grooves are horizontal or inclined to the surface on which the switch function of the first or the second substrate is not formed.

5. The sensor having the switch function according to claim 1, comprising a three dimensional-shaped side surface electrode provided with the same function of the conducting part of the switch as the side surface electrode.

6. The sensor having the switch function according to claim 1, wherein the first substrate is a semiconductor having the conducting part formed on an insulator.

7. The sensor having the switch function according to claim 1, wherein the sensor having the switch function and a semiconductor integrated circuit are formed in the same process.

8. The sensor having the switch function according to claim 1, which has a normally-on or a normally-off function when the surface on which the switch function of the first or the second substrate is not formed is in a horizontal position.

9. The sensor having the switch function according to claim 1, wherein each sensor comprises a plurality of sensors, an arbitrary combination of each sensor or a combination thereof, and has complex functions.

10. A manufacturing method of the sensor having the switch function according to claim 1, wherein the method contains a process of separating all at once each of a sensor having the switch function or a sensor having a switch function integrated with the semiconductor integrated circuit, after a process of holding the conductive moving member by the first and the second substrate.

11. An electronic device incorporating therein the sensor having the switch function according to claim 1.

12. The electronic device according to claim 11, wherein the device is a portable terminal.

* * * * *